United States Patent [19]

Malloy

[11] 4,423,803
[45] Jan. 3, 1984

[54] TORQUE CONVERTER CLUTCH WITH A TEMPERATURE REGULATOR VALVE

[75] Inventor: John D. Malloy, Troy, Mich.

[73] Assignee: General Motors Corporation, Detroit, Mich.

[21] Appl. No.: 318,324

[22] Filed: Nov. 5, 1981

[51] Int. Cl.³ .................... F16D 13/72; F16D 25/06
[52] U.S. Cl. .......................... 192/3.29; 192/82 T; 192/87.1; 192/101; 192/113 B
[58] Field of Search ................ 192/3.25, 3.26, 3.27, 192/3.28, 3.29, 3.30, 3.31, 58 B, 86, 48.3, 87.1, 113 B, 82 T, 101, 85 A

[56] References Cited

U.S. PATENT DOCUMENTS

| 3,690,428 | 9/1972 | LaFlame | 192/58 B |
| 4,181,203 | 1/1980 | Malloy | 192/3.31 |
| 4,317,510 | 3/1982 | Staub | 192/3.29 |

Primary Examiner—George H. Krizmanich
Assistant Examiner—Mark Manley
Attorney, Agent, or Firm—Donald F. Scherer

[57] ABSTRACT

A torque converter clutch is provided with a temperature responsive valve which controls fluid flow from the apply chamber to the release chamber which is connected to exhaust. The increased fluid flow provides additional cooling for a viscous clutch which is included in the torque converter clutch.

3 Claims, 1 Drawing Figure

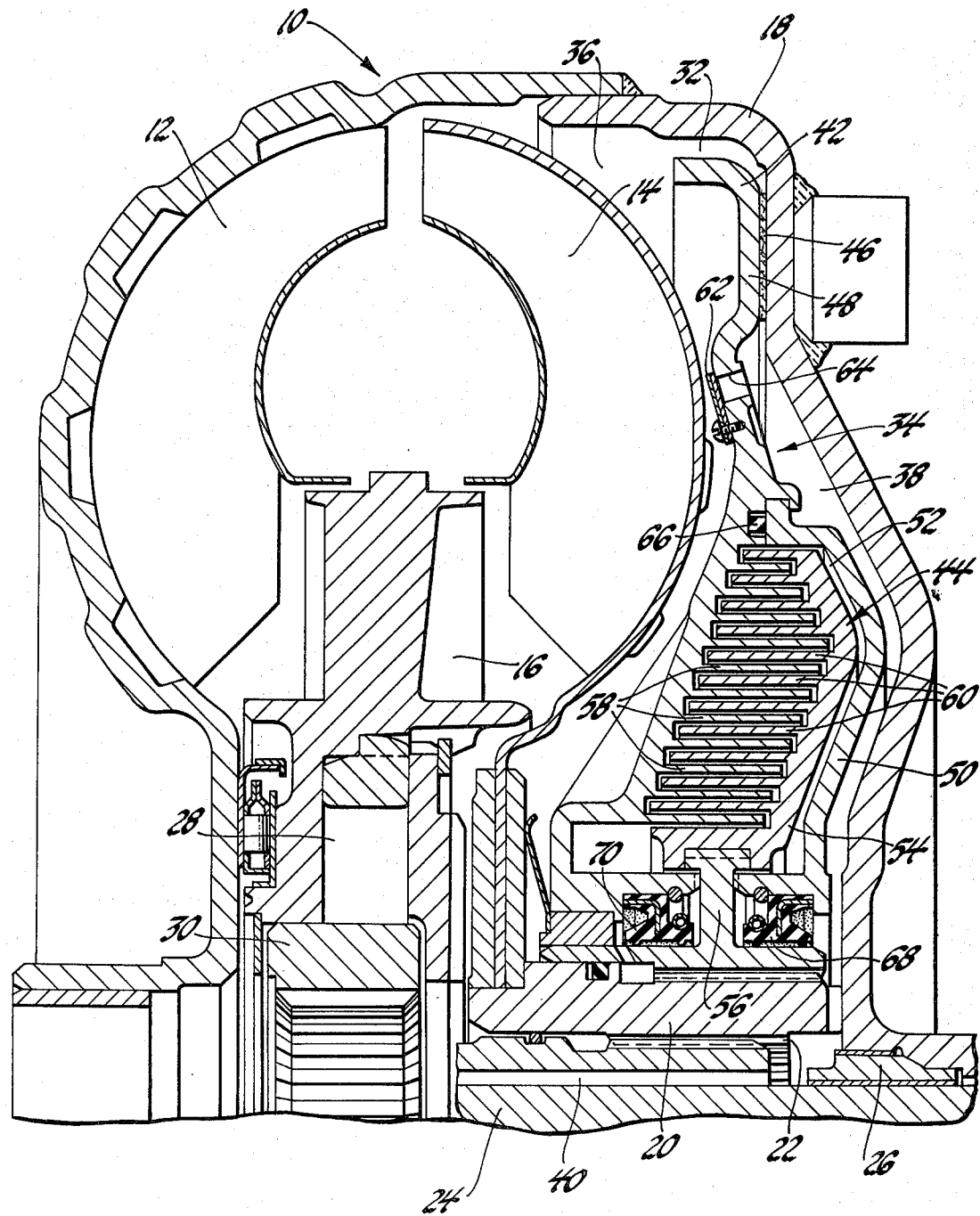

TORQUE CONVERTER CLUTCH WITH A TEMPERATURE REGULATOR VALVE

This invention relates to torque converter clutches and more particularly to such clutches having a temperature regulator valve for controlling fluid temperature in the clutch apply chamber.

It is an object of this invention to provide an improved torque converter clutch having a valve mechanism responsive to the temperature in the clutch apply chamber to control the fluid flow from the chamber.

It is another object of this invention to provide an improved torque converter clutch having a temperature responsive valve mechanism for increasing fluid flow across the clutch apply pressure plate as the temperature of the fluid in the apply chamber increases.

These and other objects and advantages of the present invention will be more apparent from the following description and drawing in which is shown a torque converter, generally designated 10, including a bladed impeller member 12, a bladed turbine member 14 and a bladed stator member 16. The impeller 12 is secured to an annular dish-shaped input shell 18 which is adapted to drivingly connect to an internal combustion engine, not shown. The turbine 14 has a hub member 20 including a splined diameter 22 which is drivingly connected to a torque converter output shaft 24. The torque converter output shaft 24 is rotatably supported in a bushing 26 secured in the input shell 18. The stator 16 includes a one-way device 28 having a hub portion 30 which is adapted to be connected to a stator shaft, not shown, in a conventional manner.

The input shell 18 and turbine 14 cooperate to form a clutch chamber 32 in which is disposed a torque converter clutch, generally designated 34. The torque converter clutch separates the clutch chamber 32 into an apply chamber 36 formed between the clutch 34 and the turbine 14 and a release chamber 38 formed between the input shell 18 and the clutch 34. The release chamber 38 is in fluid communication with a fluid passage 40 formed in the transmission output shaft 24. The passage 40 is connected to high pressure fluid in a well-known manner when it is desirable to disengage or release the clutch 34.

The clutch 34 incorporates two clutch structures disposed in serial drive relationship. These clutch structures are a friction clutch 42 and a viscous shear clutch, generally designated 44. The friction clutch 42 has a friction facing 46 and a pressure plate 48. The pressure plate 48 also forms a portion of the viscous clutch 44. The pressure plate 48 responds to fluid pressure in the apply chamber 36 to cause frictional engagement between the input shell 18 and the friction facing 46.

The viscous clutch 44 has a housing member 50 secured to the pressure plate 48 and cooperating therewith to form a fluid cavity 52 in which is disposed a clutch output member 54 having a hub 56 which is splined to the hub 20. The pressure plate 48 has a plurality of axially extending annular projections 58 which are interleaved with a corresponding plurality of axially extending annlar projections 60 formed on the clutch output member 54.

As is well-known, the annular projections 58 and 60 transmit torque when they are in the presence of a highly viscous fluid, such as silicone oil. It is also known that such clutch structures generate heat due to the slipping phenomenon which must be removed to prevent damage. The heat generated in the viscous clutch is removed by the hydraulic fluid in the torque converter which circulates in the apply chamber 36 and the release chamber 38 adjacent the viscous clutch 44.

The pressure plate 48 has secured thereto a thermostatic or bimetal valve 62 which covers aperture or opening 64 extending between the apply chamber 36 and the release chamber 38. The bimetal valve 62 is urged to a position to close the aperture 64 by fluid pressure in apply chamber 36, until a predetermined temperature, for example 180° F. (83° C.), is present in the fluid in the apply chamber 36. If this temperature is exceeded, the bimetal valve 62 will begin to open the permit fluid flow from the apply chamber 36 to the release chamber 38. A portion of the fluid leaving release chamber 38 passes through a cooler, not shown, prior to returning to the transmission sump, not shown. The fluid entering the apply chamber 36 is cooler than the fluid within the chamber. The heat generated in the viscous clutch 44 is conveyed to the fluid in apply chamber 36 and release chamber 38. The cooler incoming fluid increases the heat rejection from the viscous clutch 44.

If the temperature of the fluid in apply chamber 36 increases significantly above the threshold temperature (i.e. 180° F.), the flow through bimetal valve 62 will be sufficient to reduce the apply force of friction clutch 42. Thus, the torque capacity of clutch 42 is reduced to accommodate the reduction in the torque transmitted by viscous clutch 44 due to the high temperature. Therefore, the temperature of the viscous fluid will decrease due to both the decrease in energy transmitted and the increased fluid flow through bimetal valve 62.

The silicone fluid within the viscous clutch 44 is sealed in the clutch cavity 52 by an outer annular seal 66 and a pair of lip-type seals 68 and 70 disposed adjacent the inner confines of the clutch cavity 52. Since this is a closed system, the only heat rejection possible is via the hydraulic fluid circulated through the torque converter 10. Thus, the fluid flow through the bimetal valve 62 is a desirable feature, as pointed out above, for increased heat rejection capacity which may be necessary. This bimetal valve 62 can be used in conjunction with a pressure differential valve such as that shown in U.S. patent application Ser. No. 318,327 filed Nov. 5, 1981 and assigned to the assignee of this application.

The embodiments of the invention in which an exclusive property or privilege is claimed are defined as follows:

1. A thermally sensitive control and torque converter clutch for use in a torque converter comprising; a friction clutch selectively engageable with the input of the torque converter and including a pressure plate; a viscous shear clutch in series drive relation with said friction clutch and being drivingly connected to the output of the torque converter; apply chamber means and release chamber means on opposite sides of said pressure plate; a passage means through said pressure plate connecting said apply chamber means to said release chamber means; and thermally sensitive valve means mounted on said pressure plate for normally closing said passage means when the temperature in said apply chamber means is below a predetermined value and for opening communications between said apply chamber means and said release chamber means when the temperature is above said predetermined value.

2. A thermally sensitive control and torque converter clutch for use in a torque converter comprising; a friction clutch selectively engageable with the input of the torque converter and including a pressure plate; a viscous shear clutch in series drive relation with said friction clutch and being drivingly connected to the output of the torque converter; apply chamber means and release chamber means on opposite sides of said pressure plate; a passage means through said pressure plate connecting said apply chamber means to said release chamber means; and thermally sensitive valve means including a bimetal strip mounted on said pressure plate for normally closing said passage means when the temperature in said apply chamber means is below a predetermined value and for providing controlled fluid communication between said apply chamber means and said release chamber means when the temperature is above said predetermined value.

3. A thermally sensitive control and torque converter clutch for use in a torque converter comprising; a friction clutch selectively engageable with the input of the torque converter and including a pressure plate; a viscous shear clutch in series drive relation with said friction clutch and being drivingly connected to the output of the torque converter; apply chamber means and release chamber means on opposite sides of said pressure plate; a passage means through said pressure plate connecting said apply chamber means to said release chamber means; and thermally sensitive bimetal valve means mounted on said pressure plate for normally closing said passage means when the temperature in said apply chamber means is below a predetermined value and for opening communication between said apply chamber means and said release chamber means when the temperature is above said predetermined value to increase fluid flow between said chambers.

* * * * *